United States Patent [19]

Peonski

[11] 4,182,044
[45] Jan. 8, 1980

[54] GAUGING DEVICE FOR TAPERED ROLLERS OR THE LIKE

[75] Inventor: Edward Peonski, Dundee, Ill.

[73] Assignee: American Gage & Machine Company, Elgin, Ill.

[21] Appl. No.: 959,892

[22] Filed: Nov. 13, 1978

[51] Int. Cl.² ............... G01B 7/04; G01B 7/12; G01B 7/30
[52] U.S. Cl. .................. 33/174 L; 33/174 E; 33/178 E; 209/660
[58] Field of Search .......... 33/174 E, 174 L, 178 E; 209/659, 660, 666, 673, 675, 676

[56] References Cited

U.S. PATENT DOCUMENTS

| | | | |
|---|---|---|---|
| 1,555,883 | 10/1925 | Schlaupitz | 33/174 E |
| 2,016,420 | 10/1935 | Engst | 33/174 L |
| 2,593,986 | 4/1952 | Comstock | 33/174 L |
| 2,901,105 | 8/1959 | Harder | 33/174 L |
| 3,327,399 | 6/1967 | Gershman | 33/174 E |

FOREIGN PATENT DOCUMENTS

| | | | |
|---|---|---|---|
| 311805 | 4/1919 | Fed. Rep. of Germany | 209/659 |
| 825242 | 12/1959 | United Kingdom | 33/178 E |

*Primary Examiner*—Richard R. Stearns
*Attorney, Agent, or Firm*—Burmeister, York, Palmatier, Hamby & Jones

[57] ABSTRACT

A gauging device for gauging tapered rollers or the like, comprising feeding means for feeding each roller to a gauging station, first and second lower knife edges or the like projecting upwardly at the gauging station for supporting each roller, an end knife edge or the like at the gauging station for engaging one end of the roller, and a gauging head having an upper knife edge or the like projecting downwardly at the gauging station for engaging an upper portion of the roller, the gauging head having biasing means for biasing the upper knife edge downwardly against the roller, and output or indicating means for producing an output corresponding precisely with the position of the upper knife edge. The feeding means may comprise a rotatable wheel having pockets therein for carrying the rollers to the gauging station. A chute may be provided to feed the rollers into the pockets in the wheel. The gauging device is preferably inclined so that each roller is biased by gravity against the end knife edge. Additional biasing means, such as a spring member, may be provided to bias each roller against the lower knife edges and the end knife edge. The knife edges preferably have convexly curved edges projecting into the path of each roller at the gauging station to facilitate the positive entry of each roller between the knife edges. The knife edge may be adjustable to provide for the gauging of rollers of various sizes.

16 Claims, 9 Drawing Figures

GAUGING DEVICE FOR TAPERED ROLLERS OR THE LIKE

This invention relates to a gauging device which is particularly well adapted for gauging tapered rollers, of the type often used in roller bearings, but is also well adapted for gauging rollers generally and other similar elements.

One principal object of the present invention is to provide an automatic device or machine for gauging the diameter of tapered rollers, or other similar elements, with a high degree of speed and precision.

A further object is to provide such a new and improved gauging device which is adapted to receive a continuous series of tapered rollers or the like from a grinding machine, and to gauge the diameter of each roller, so as to monitor the operation of the grinding machine. The output of the gauging machine may be employed to readjust the grinding machine, as needed.

In accordance with the present invention, these and other objects may be achieved by providing a gauging device comprising feeding means for feeding each roller to a gauging station, first and second lower knife edges, or other linear engaging elements, for supporting each roller at the gauging station, an end knife edge, or other linear engaging element, at the gauging station for engaging one end of the roller, and a gauging head having an upper knife edge, or other linear engaging element, projecting downwardly at the gauging station for engaging and upper portion of the roller, the gauging head having biasing means for biasing the upper knife edge downwardly against the roller, and indicating or output means for producing an output corresponding precisely with the position of the upper knife edge. The output means may include an indicating device and means for readjusting the grinding machine, as needed.

The gauging device is preferably inclined, so that the roller at the gauging station will be biased by gravity against the end knife edge.

The feeding means may comprise a rotatable wheel having one or more pockets for receiving the rollers and positively carrying them along a predetermined path to the gauging station. A chute may be provided to feed the rollers to the pockets in the wheel.

The knife edges at the gauging station may project into the path of the roller, so that each roller is positively moved between the knife edges at the gauging station.

The knife edges may have convexly curved edges to facilitate the entry of the roller between the knife edges at the gauging station.

The gauging device may include additional biasing means, such as a spring member, for biasing the roller at the gauging station against the lower knife edges and the end knife edge.

Further objects, advantages and features of the present invention will appear from the following description, taken with the accompanying drawings, in which.

Figure 1:
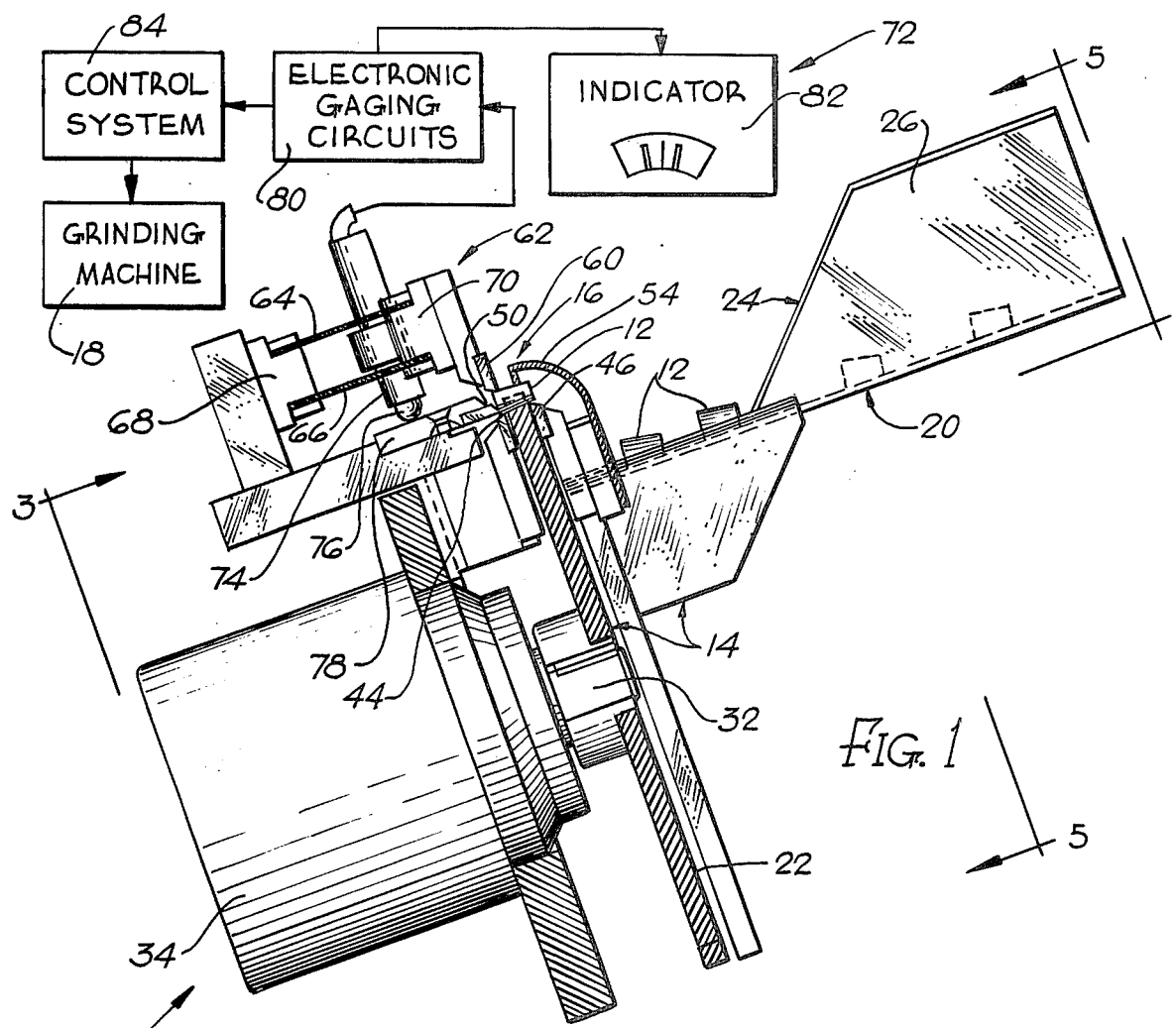
FIG. 1 is a diagrammatic side elevation, partly in section, showing a gauging device or machine to be described as an illustrative embodiment of the present invention.

As just indicated, the drawings illustrate a gauging device or machine 10, for automatically gauging a continuous series of tapered rollers 12, or other similar elements. The gauging device 10 is especially well adapted for gauging tapered rollers of the type often employed in roller bearings, but is also well adapted for gauging rollers generally, and other similar elements.

The gauging device 10 comprises feeding means 14 for feeding the successive individual rollers 12 to a gauging station 16, where the diameter of each of the rollers is gauged.

The rollers 12 may be received directly from a grinding machine 18, indicated diagrammatically as a block in FIG. 1, which grinds the tapered frusto-conical periphery of each of the rollers 12. The gauging machine 10 may be employed to readjust the grinding machine 18, as needed, to maintain the diameter of the rollers 12 within the desired tolerances.

Figure 6:
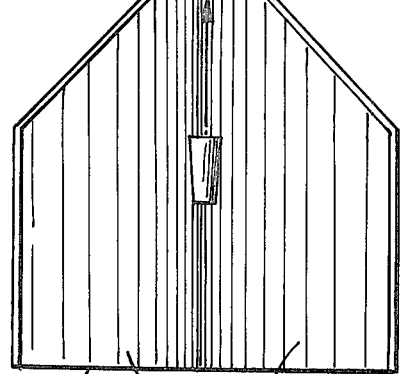
FIG. 6 is a diagrammatic fragmentary plan view, taken generally as indicated by the line 6—6 in FIG. 5.
Figure 5:
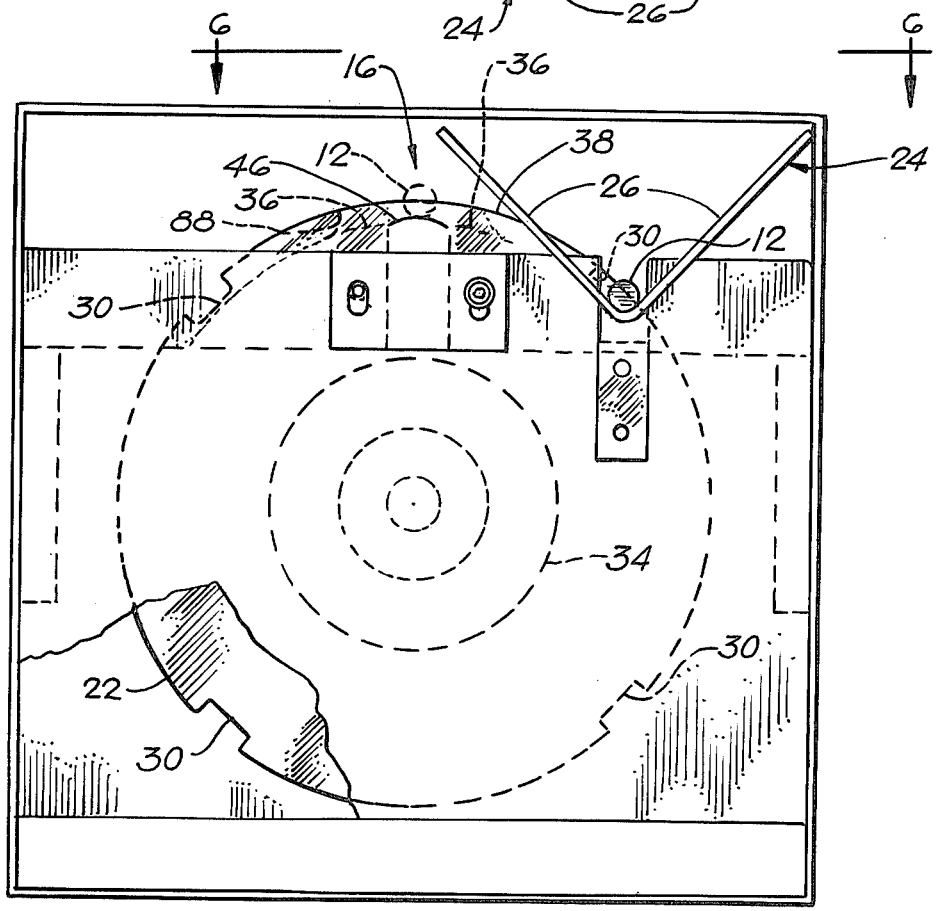
FIG. 5 is a diagrammatic front elevation, taken generally as indicated by the line 5—5 in FIG. 1.

As shown in FIGS. 1, 5 and 6, the illustrated feeding means or device 14 includes as inclined chute or trough 20, which is adapted to receive the rollers 12 from the grinding machine 18, and to guide and direct the rollers 12, so that they will travel downwardly by gravity along the chute 20 to a feeding or transporting wheel 22. The illustrated chute 20 has a generally V-shaped hopper-like portion 24 formed by a pair of oppositely sloping wings 26, which direct the rollers 12 to the lower extremity of the chute 20, so that the rollers will slide in a single file along the lower extremity of the chute 20 to the feeder wheel 22.

As shown in FIGS. 1, 3, 5 and 6, the illustrated feeder wheel 22 may be in the form of a generally circular disc having a peripheral portion formed with at least one and preferably several pockets or notches 30 for receiving and carrying the individual rollers 12. The feeder wheel 22 is provided with means for rotating the wheel, either continuously or intermittently, at a relatively low speed. As shown in FIG. 1, the feeder wheel 22 is mounted on the rotatable output shaft 32 of a motor 34, which may be of the gear reduction type.

Figure 2:
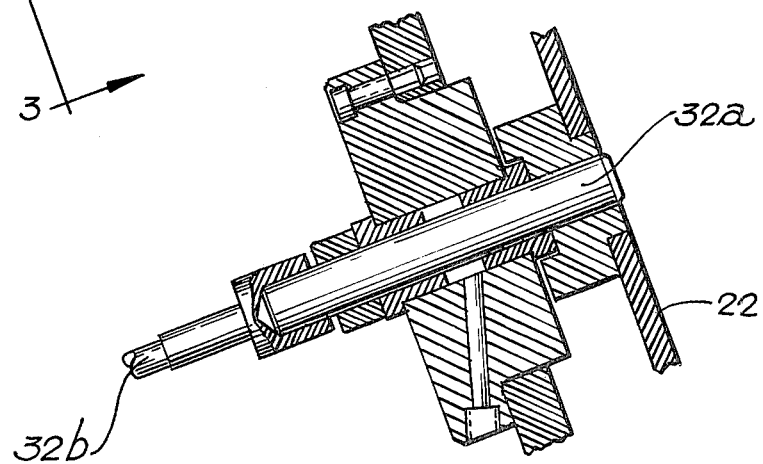
FIG. 2 is a fragmentary section, corresponding to a portion of FIG. 1, and illustrating a modification.
Figure 4:
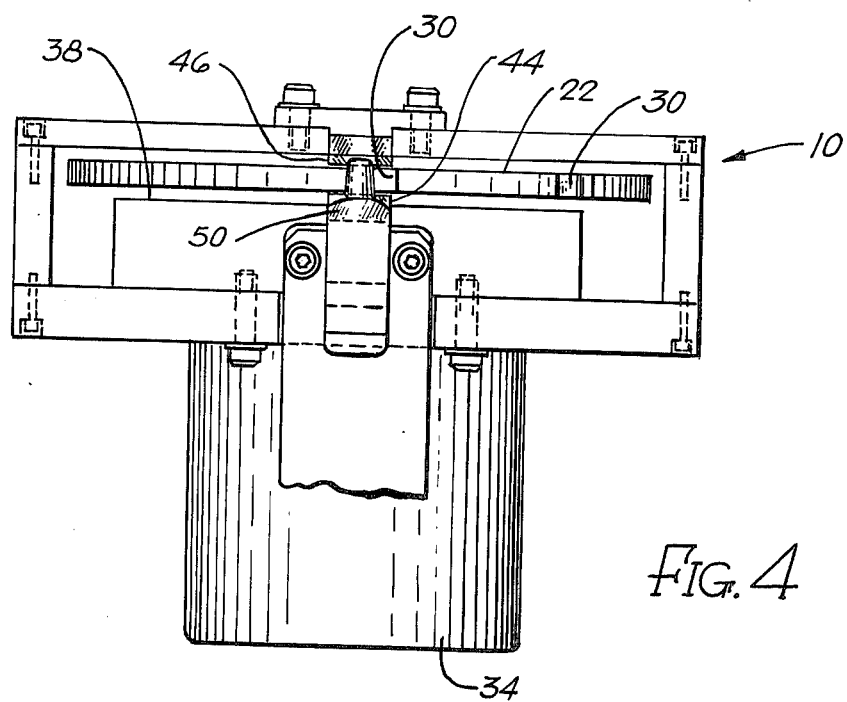
FIG. 4 is a diagrammatic plan view of the gauging device of FIG. 1.
Figure 3:
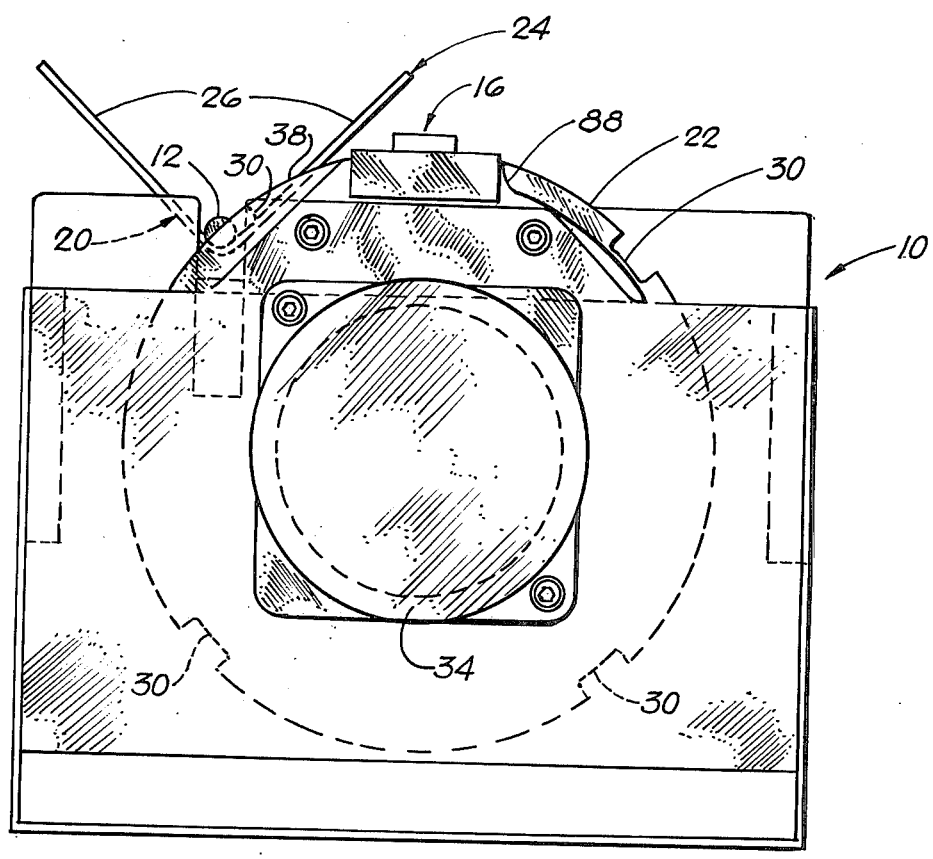
FIG. 3 is a diagrammatic rear elevation, taken generally as indicated by the line 3—3 in FIG. 1.

FIG. 2 shows a modified construction in which the feeder wheel 22 is mounted on a rotatable shaft 32a, adapted to be rotated by suitable drive means, which may include the illustrated flexible shaft 32b, adapted to be connected to a suitable motor, not shown.

The rotation of the feeder wheel 22 brings each pocket 30 in turn into registration with the discharge end of the chute 20, whereupon the lowermost roller 12 in the chute 20 slides into the pocket 30 from the chute 20. The continued rotation of the feeder wheel 22 carries the roller 12 along a predetermined path to the gauging station 16. Such path has a circular curvature and is arcuate in shape in this instance. A portion of the arcuate path is indicated by broken lines 36 in FIG. 5.

Figure 7:
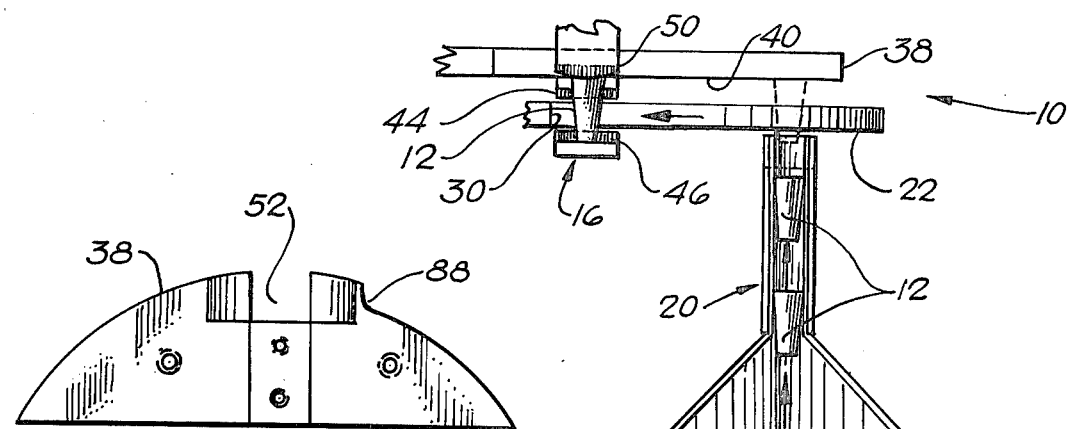
FIG. 7 is a rear elevation of a guide plate, constituting a component of the gauging device of FIG. 1.
Figures 8, 9:
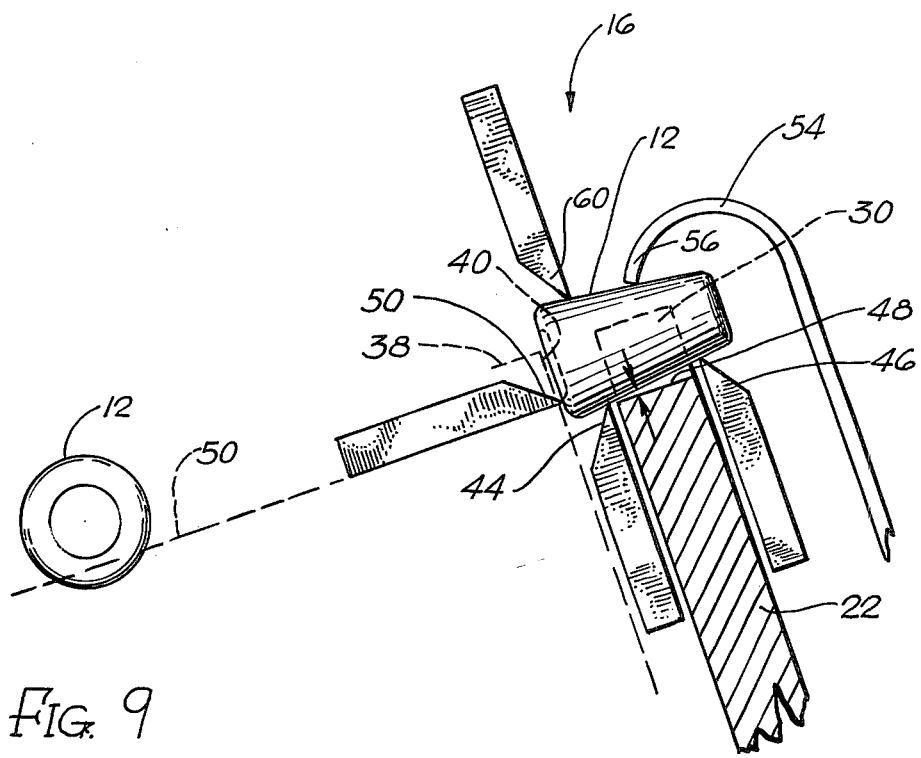
FIG. 8 is a fragmentary enlarged diagrammatic section, corresponding to a portion of FIG. 1, and illustrating the roller at the gauging station.
FIG. 9 is a diagrammatic end view of the roller at the gauging station.

It will be seen from FIGS. 1 and 8 that the gauging device 10 is tilted or inclined, in this instance, so that the rollers 12 will travel by gravity along the inclined chute 20, and will be fed by gravity into the pockets 30 in the wheel 22. The illustrated pockets 30 are simply notches in the wheel 22 and are open on both sides of the wheel. To keep the rollers 12 from falling out of the pockets 30 as the rollers are being transported to the gauging station 16, a guide plate or member 38 is provided to the rear of the feeder wheel 22, for engagement by the rear end of the roller 12, as shown most clearly in FIG. 6. In this case, the guide plate 38 is a separate piece which is shown separately in FIG. 7. The roller 12 in the pocket 30 is biased by gravity against a front surface 40 of the guide plate 38, so that the rear end of the roller 12 will slide along the front surface 40 as the roller is carried by the wheel 22 to the gauging station 16.

At the gauging station 16, as shown in FIGS. 1, 4, 5, 6 and 8, each individual roller 12 is brought into supporting engagement with a pair of lower reference engaging or contacting elements, preferably linear engaging elements. As shown, such linear engaging elements take the form of first and second lower knife edges 44 and 46, which project upwardly into the path of movement of each roller 12 as it reaches the gauging station 16. The knife edges 44 and 46 are fixed in position during use, but preferably are adjustable to accommodate the gauging of rollers of various sizes. Preferably, the lower knife edges 44 and 46 are generally parallel to each other, and also generally parallel to the path of movement of the roller 12. The lower knife edges 44 and 46 project into the path of the lower extremity of the roller 12 and are engageable with such lower extremity or peripheral portion of the roller 12. Thus, the lower knife edges 44 and 46 have the effect of lifting or displacing the roller 12 upwardly, out of engagement with the bottom surface 48 of the corresponding pocket 30 in the feeder disc 22. Accordingly, the position of the roller 12 at the gauging station 16 is controlled by the knife edges 44 and 46, and not by the lower wall or surface 48 of the pocket 30. Accordingly, the knife edges 44 and 46 provide lower reference contacts for precisely positioning the roller 12.

Preferably, the lower knife edges 44 and 46 are convexly curved, as shown in FIG. 5, to facilitate the movement of each individual roller 12 into the gauging station 16. FIG. 5 also clearly illustrates the fact that the knife edges 44 and 46 project upwardly beyond the broken line 36, representing the path of the lower extremity of the roller 12.

The lower knife edges 44 and 46 are illustrated as having sharp edges, but the edges could be somewhat rounded, while still serving as linear engaging elements. While the knife edges provide highly precise linear engaging elements, such elements could in some cases be in the form of bars of round or other suitable cross section. Each of the knife edges 44 and 46 is adapted to make contact with the rounded periphery of the roller 12 at a single point. At the same time, the knife edges 44 and 46 serve as stable reference supports for the roller 12.

At the gauging station 16, the illustrated gauging device 10 also has an end linear engaging or contacting element, preferably in the form of the illustrated knife edge 50, which is adapted to engage the rear end of each individual roller 12 as it is brought to the gauging station 16. At the gauging station 16, the guide plate 38 is preferably formed with a cutout or opening 52, so that the rear end of the roller 12 engages the knife edge 50, rather than the guide plate 38. As shown in FIG. 8, the end reference knife edge 50 preferably projects forwardly into the path of the roller 12, so that the roller is positively moved into engagement with the knife edge 50. Thus, it will be seen that the knife edge 50 projects forwardly, slightly beyond the plane of the front surface 40 of the guide plate 38.

As shown in FIG. 6, the end knife edge 50 is preferably convexly curved, to facilitate the engagement of the rear end of the roller 12 with the knife edge 50 at the gauging station 16. The end knife edge 50 provides a highly precise reference contact for the rear end of the roller 12, but the knife edge 50 may assume other linear engaging forms, as discussed in connection with the knife edges 44 and 46.

Each successive roller 12 is biased by gravity against the lower knife edges 44 and 46 and the end knife edge 50, due to the tilt or inclination of the gauging device 10. However, it is preferred to provide additional biasing means for biasing the roller 12 against the knife edges 44, 46 and 50. Such biasing means may take the form of resilient means, such as the illustrated spring member 54. As shown, the spring member 54 is in the form of a resilient strip or leaf, having an end or edge 56 which is engageable with the upper extremity of the roller 12 at the gauging station 16. The edge 56 of the leaf spring 54 preferably projects into the path of the roller 12, so that the roller is positively brought into engagement with the spring 54 at the gauging station 16. The spring 54 passes the roller 12 downwardly against the lower knife edges 44 and 46, and also against the end knife edge 50.

At the gauging station 16, each successive roller 12 is also engaged by a gauging contact 60 on a gauging head 62. The gauging contact 60 engages the periphery of the roller 12 in opposition to the lower reference contacts 44 and 46. Thus, the gauging contact 60 is engageable with the upper extremity or peripheral portion of the roller 12.

As shown, the gauging contact 60 is in the form of a knife edge, projecting downwardly into the path of the roller 12. The knife edge 60 is generally parallel with the path of the roller 12, and also is in a plane which is generally parallel with the planes of the lower knife edges 44 and 46. The upper knife edge 60 serves as a highly precise linear engaging element, but other types of linear engaging elements may also be employed in some cases, as discussed in connection with the lower knife edges 44 and 46. As in the case of the other knife edges, the upper knife edge 60 is preferably convexly curved, to facilitate the entry of the roller 12 between the upper knife edge 60 and the lower knife edges 44 and 46.

Preferably, the upper knife edge 60 is biased downwardly against the roller 12, so as to bias the roller against the lower knife edges 44 and 46, as well as the end knife edge 50. To produce this biasing action, the gauging head 62 preferably includes resilient means. As shown in FIG. 1, such resilient means may take the form of upper and lower generally parallel leaf springs 64 and 66, extending between a fixed support 68 and a movable gauging carriage 70. The leaf springs 64 and 66 provide a resilient support for the carriage 70, so that it is movable upwardly and downwardly against the resilient biasing action of the springs 64 and 66. The upper knife edge 60, serving as the gauging contact, is secured to the movable gauging carriage 70.

Initially, when there is no roller 12 at the gauging station 16, the gauging contact 60 projects downwardly into the path of the roller. When each successive roller is moved to the gauging station 16, the roller 12 causes upward movement or displacement of the gauging contact 60, so that the carriage 70 is moved upwardly against the resilient resistance afforded by the springs 64 and 66. The amount of this movement is determined by the size of the roller 12.

The gauging head 62 is also provided with gauging means or a gauging system for producing an output corresponding to the position or movement of the movable carriage 70. Any known or suitable gauging system may be employed, ranging from a dial indicator to an electronic gauging system. As shown in FIG. 1, the gauging device or machine 10 employs an electronic gauging system 72, including a transducer 74 for producing electrical signals corresponding to the movement of a plunger 76. The transducer 74 may be of the differential transformer type, or of any other suitable type. As shown, the transducer 74 is mounted on the movable carriage 70, while the plunger 76 is biased downwardly against a fixed member 78. A spring or any other suitable biasing means may be provided to bias the plunger 76 downwardly.

When the gauging contact or knife edge 60 is displaced upwardly by the roller 12 at the gauging station 16, the plunger 76 is moved downwardly relative to the transducer 74, so that the signals produced by the transducer 74 are correspondingly changed. These signals are supplied to electronic gauging circuits 80, which may be adapted to operate an electrical indicator 82. Any known or suitable indicator may be employed, such as an indicator of the type which produces a visible indication as to whether the roller 12 is within the desired upper and lower tolerance limits.

The electronic gauging circuit 80 may also be employed to operate any known or suitable control system 84 for readjusting the grinding machine 18, as needed, to maintain the rollers 12 within the tolerance limits. Electronic gauging systems of this kind are well known to those in the art.

As previously indicated, the rotation of the feeder wheel 22 carries each successive roller 12 to the gauging station 16, where the roller is gauged. The rotation of the feeder wheel 22 then carries the roller 12 away from the gauging station 16. In the illustrated gauging machine 10, each roller 12 is then allowed to drop by gravity out of the corresponding pocket 30 in the feeder wheel 22. To provide for such gravitational movement of each roller 12, a cutout 88 is formed in the guide plate 38, beyond the gauging station 16, so that the rear end of the roller 12 is no longer supported by the guide plate 38, when the roller is moved opposite the cutout 88. Thus, the weight of the roller 12 causes it to drop out of the corresponding pocket 30. Each roller may drop into any suitable receptacle, not shown. If it is desired to eject each roller 12 from the corresponding pocket 30 with greater impetus, any desired ejecting means may be provided, such as an airblast. The tilting or inclination of the gauging machine 10 assists in the discharge of the rollers 12 from the pockets 30 in the feeder wheel 22, after the rollers have been gauged.

The gauging device or machine 10 is particularly well adapted for gauging tapered rollers, because each roller is precisely supported in a stable reference position by the lower reference knife edges or contacts 44 and 46 and the end reference knife edge or contact 50. The spring 54 securely biases the roller against the reference contacts 44, 46 and 50. The position of the gauging contact 60 then precisely indicates the size of the tapered roller 12. It will be understood that the gauging device 10 is also well suited for gauging rollers generally, and other suitable items which need to be gauged.

For proper gauging, the tapered rollers 12 need to be supplied to the gauging station with the correct orientation. This is readily achieved, because all of the rollers are delivered from the grinding machine with the same orientation. If a particular roller becomes reversed in orientation, it will be carried past the gauging station 16 without being gauged. The electronic gauging system can readily be programmed to withhold any output in the case of a reversed roller, so that the grinding machine will not be readjusted.

The reference knife edges or contacts 44, 46 and 50 (FIGS. 1 and 8) at the gauging station 16 are fixed in position during use, but are preferably adjustable to accommodate the gauging of rollers or the like of various sizes and shapes. Similarly, the spring member 54 is also preferably adjustable in position. The gauging knife edge or contact 60 is preferably adjustable relative to the movable carriage 70, to accommodate the gauging of rollers of various sizes and shapes.

I claim:

1. A gauging device for gauging rollers or the like, comprising
    transporting means for transporting each roller individually to a gauging station,
    first and second lower knife edges projecting upwardly at said gauging station for supporting each roller,
    an end knife edge at said gauging station and spaced above said lower knife edges for engaging one end of the roller,
    and a gauging head having an upper knife edge projecting downwardly at said gauging station for engaging the upper extremity of the roller,
    said gauging head having resilient means for biasing said upper knife edge downwardly against the roller, and
    precision indicating means for indicating the precise position of said upper knife edge.

2. A gauging device according to claim 1, including additional resilient means for engaging the roller and biasing the roller against said lower knife edges and said end knife edge.

3. A gauging device according to claim 1, including a spring member for engaging the roller and biasing the roller against said lower knife edges and said end knife edge.

4. A gauging device according to claim 1, in which said first and second lower knife edges are in an inclined plane for supporting the roller at an inclined angle whereby the roller is biased by gravity against said end knife edge.

5. A gauging device according to claim 1, in which said transporting means include conveying means for conveying each roller individually along a predetermined path to said gauging station and then away from said gauging station,
    said knife edges projecting into said predetermined path of the roller at said gauging station, whereby the roller is positively moved into engagement with said knife edges by said conveying means.

6. A gauging device according to claim 1, in which said transporting means comprise a transporting wheel having a peripheral portion with at least one pocket therein for receiving a roller and transporting the roller along a predetermined path to said gauging station.

7. A gauging device according to claim 1, in which said transporting means include a transporting wheel having a plurality of pockets for receiving the individual rollers and transporting each individual roller along a predetermined path to said gauging station, said knife edges projecting into said predetermined path, whereby said transporting wheel positively moves each roller into engagement with said knife edges at said gauging station.

8. A gauging device according to claim 7, in which said knife edges have convexly curved edges to facilitate the entry of the roller between said knife edges at said gauging station.

9. A gauging device for gauging rollers or the like, comprising feeding means for feeding each roller to a gauging station, first and second lower linear engaging elements at said gauging station for engaging and supporting each roller, an end linear engaging element at said gauging station for engaging one end of the roller, and a gauging head having an upper linear engaging element for engaging an upper portion of the roller, said gauging head having biasing means for biasing said upper linear engaging element downwardly against the roller, and output means for producing an output corresponding precisely with the position of said upper linear engaging element.

10. A gauging device according to claim 9, including additional biasing means for engaging the roller and biasing the roller against said lower linear engaging elements and said end linear engaging element.

11. A gauging device according to claim 9, including a spring member for engaging the roller and biasing the roller against said lower linear engaging elements and said end linear engaging element.

12. A gauging device according to claim 9, in which said first and second lower linear engaging elements are in an inclined plane for supporting the roller at an inclined angle whereby the roller is biased by gravity against said end linear engaging element.

13. A gauging device according to claim 9, in which said feeding means include conveying means for conveying each roller individually along a predetermined path to said gauging station and then away from said gauging station, said linear engaging elements projecting into said predetermined path of the roller at said gauging station, whereby the roller is positively moved into engagement with said linear engaging elements by said conveying means.

14. A gauging device according to claim 9, in which said feeding means comprise a transporting wheel having a peripheral portion with at least one pocket therein for receiving a roller and transporting the roller along a predetermined path to said gauging station.

15. A gauging device according to claim 9, in which said feeding means include a transporting wheel having a plurality of pockets therein for receiving the individual rollers and transporting each individual roller along a predetermined path to said feeding station, said linear engaging elements projecting into said predetermined path, whereby said transporting wheel positively moves each roller into engagement with said linear engaging elements at said gauging station.

16. A gauging device according to claim 15, in which said linear engaging elements have convexly curved engaging elements to facilitate the entry of the roller between said linear engaging elements at said gauging station.

* * * * *

UNITED STATES PATENT AND TRADEMARK OFFICE
CERTIFICATE OF CORRECTION

PATENT NO. : 4,182,044
DATED : January 8, 1980
INVENTOR(S) : Edward Peonski

It is certified that error appears in the above-identified patent and that said Letters Patent are hereby corrected as shown below:

Column 4, line 31, "passes" should be -- presses --

Signed and Sealed this

Sixth Day of May 1980

[SEAL]

Attest:

SIDNEY A. DIAMOND

Attesting Officer

Commissioner of Patents and Trademarks